United States Patent [19]

Nicholson et al.

[11] 4,210,452
[45] Jul. 1, 1980

[54] NOVEL INTUMESCENT COMPOSITION

[75] Inventors: Richard R. Nicholson; Ray E. Smith; Jayendra G. Shukla, all of Ann Arbor, Mich.

[73] Assignee: Veesicol Chemical Corporation, Chicago, Ill.

[21] Appl. No.: 966,931

[22] Filed: Dec. 6, 1978

[51] Int. Cl.$^2$ .............................................. C09D 5/18
[52] U.S. Cl. .................... 106/18.18; 106/18.19; 106/18.21; 252/8.1; 260/DIG. 24; 260/27.4 R; 427/393.3; 428/921; 521/106; 521/107
[58] Field of Search ............... 106/18.18, 18.19, 18.21; 8/116 P; 252/8.1; 260/DIG. 24, 29.4 R; 521/106, 107; 428/920, 921; 427/393, 397

[56] References Cited

U.S. PATENT DOCUMENTS

| | | | |
|---|---|---|---|
| 2,582,961 | 1/1952 | Burnell et al. | 428/278 |
| 2,661,342 | 12/1953 | Malowan | 428/274 |
| 2,676,162 | 4/1954 | Marotta | 428/920 |
| 2,711,998 | 6/1955 | Weaver et al. | 260/29.4 R |
| 2,927,050 | 3/1960 | Reeves et al. | 428/921 |
| 3,023,176 | 2/1962 | Heistand | 428/274 |
| 3,101,278 | 8/1963 | Wagner et al. | 428/277 |
| 3,398,019 | 8/1968 | Langguth et al. | 428/921 |
| 3,449,161 | 6/1969 | Hindersinn et al. | 252/8.1 |
| 3,513,114 | 5/1970 | Hahn et al. | 260/17 R |
| 3,535,130 | 10/1970 | Webb | 106/18.21 |
| 3,635,970 | 1/1972 | Fessler | 260/17 R |
| 3,654,190 | 4/1972 | Levine | 106/16 |
| 3,769,074 | 10/1973 | Roth | 428/314 |
| 3,811,992 | 5/1974 | Handa et al. | 428/534 |
| 4,026,810 | 5/1977 | Bost | 260/42.45 |
| 4,049,849 | 9/1977 | Brown | 427/325 |

*Primary Examiner*—Lorenzo B. Hayes
*Attorney, Agent, or Firm*—Dietmar Olesch

[57] ABSTRACT

There is provided an intumescent composition comprising a cyclic nitrogen compound, a phosphorus polyol, a phosphorus acid, and water.

11 Claims, No Drawings

NOVEL INTUMESCENT COMPOSITION

BRIEF SUMMARY OF THE INVENTION

A novel intumescent composition containing methylated methylol melamine, a phosphorus polyol, a phosphorus acid, and water.

DETAILED DESCRIPTION

It is difficult to impart durable flame retardance to a wood substrate. Wood substrates present a flameproofing problem which is materially different from that presented by fibrous hydrophilic organic substrates. According to U.S. Pat. No. 2,927,050, in the latter substrate " . . . substantially independent fibers are tangled together, leaving interstices capable of being filled by an aqueous medium by capillary action between all of their surfaces. The individual fibers contain a relatively small amount of cellulose, and the materials composed of them have a relatively low ignition temperature." In wood substrates, however, " . . . the cellulosic fibers are bonded together to form a relatively impenetrable block susceptible to little capillary action. A piece of wood has small surface area in relation to the amount of surface area it contains and has a relatively high ignition temperature." Because of these factors, " . . . a flameproofing agent which flameproofs fibrous hydrophilic organic materials is not likely to flameproof wood because its capacity to inhibit burning is likely to be destroyed by the time it is heated to the ignition temperature of the wood and/or because of the difficulty of causing a non-volatile substance to penetrate into the volume of a block of wood."

Impregnation of a wood substrate with a fire-retardant is known in the art. U.S. Pat. No. 3,398,019 teaches that this method must be used to impart a satisfactory degree of flame retardancy to wood fiber insulation, stating that "as far as is known only by the use of a chemical retardant which impregnates the board can a commercially acceptable building material be produced which is capable of securing a nonflammable rating." U.S. Pat. No. 4,049,849 teaches that this method, although well known, presents several substantial problems. According to this patent, the use of a wood substrate impregnated with a fire-retardant salt is restricted to low humidity applications " . . . due to the water solubility and hygroscopicity of most known fire retardant salts." Thus, " . . . if an ammonium phosphate-impregnated wood substrate is exposed to high (greater than 90 percent) humidity at ambient temperature, in approximately 3 days the fire retardant impregnant (salt) will leach therefrom . . . The salt will absorb sufficient water vapor to enable it to migrate to the wood substrate surface. Not only does this leaching deplete the salt content of the wood substrate, rendering it less fire resistant, but is also severely disfigures the wood substrate's surface . . . "

Many of the flame retardants which are used to impregnate wood substrates are acidic and hygroscopic. U.S. Pat. No. 3,811,992 teaches that the use of these compositions dehydrates the wood and that " . . . the wood, in order to make up for the dehydration caused by these hygroscopic agents, must absorb water from the moisture in the ambient air." Such moisture absorption will tend to discolor the plywood and rust and stain connecting members such as nails; and it " . . . dilutes the amount of agent used in the wood . . . and causes the wood to be damp and moist thus not only corroding the wood but subjecting it to attack from insects and the like . . . "

Those in the art have attempted to impart durable flame retardance to wood substrates by applying intumescent compositions to them. Many intumescent compositions have been tested; U.S. Pat. No. 3,668,121 correctly states that only a few of them are of any value. Many of them produce excessive smoke and/or toxic gaseous pyrolysis products. According to U.S. Pat. No. 3,769,074, most of these prior art intumescent compositions are " . . . characterized by the disadvantages of high cost, low spreading rate, relatively poor efficiency, and poor weatherability." U.S. Pat. No. 3,513,114 teaches that prior art intumescent coating compositions " . . . exhibit the distinct disadvantage of either or both failing to maintain a coating film which will withstand repeated scrubbing or washing and thus exhibit wet abrasion resistant properties and/or failing to perform their intended function, that is, to intumesce, and thus fire retard after repeated scrubbing or washing." U.S. Pat. No. 3,535,130 teaches that " . . . conventional intumescent paints are usually sensitive to attack by water . . . " U.S. Pat. No. 3,654,190 discloses that prior art intumescent compositions are water permeable and tend to degrade when exposed to moist environments.

U.S. Pat. No. 3,513,114 discloses that the problems presented by the prior art intumescent compositions cannot be solved merely by replacing the water soluble flame retardant agents they contain with water insoluble additives, for such substitution does not necessarily increase the wet abrasion resistance properties of the compositions. Furthermore, such a substitution will present a new set of problems if the water insoluble additive must be dissolved in an organic solvent; for many dangers are created by the use of the common organic solvents. Toluene, for example, is a fire hazard and an explosion hazard when exposed to heat and flame; and it emits toxic fumes. Methylene chloride is very dangerous to the eyes. Benzene is highly flammable, causes leukemia, and it is a known carcinogen. Acetone is a fire hazard when exposed to either heat or flame. Methanol possesses narcotic properties and exerts a toxic effect upon the nervous system; once it is absorbed into the body, it is eliminated very slowly and, thus, is a cumulative poison. The use of almost any of the common organic solvents will present some hazard.

U.S. Pat. No. 3,654,190 teaches that many prior art intumescent coating compositions are soft and prone to chip with rough handling.

Other prior art considered by the applicants during the preparation of this application include U.S. patent 2,711,998 (composition containing trimethylol melamine and the ammonium salt of halopropyl phosphoric acid used to flame retard cotton), U.S. Pat. No. 2,676,162 (an intumescent coating for wood containing organic solvent, methylated methylol melamine, the reaction product of ammonia and phosphoryl chloride, and a film-forming condensation product), U.S. Pat. No. 3,449,161 (fire-retardancy can be incorporated into paint compositions using organo-phosphorus amides), U.S. Pat. No. 3,635,970 (melamine phosphate is especially useful in intumescent paint compositions), U.S. Pat. No. 4,026,810 (an intumescent flame retardant prepared by reacting, e.g., phosphoric oxide, phosphoric acid, pentaerythritol, and melamine and thereafter curing the reaction product by heating to evolve gaseous products), U.S. Pat. No. 2,582,961 (an aqueous flame retardant for cellulosic fiber containing, e.g., methylated methylol melamine, methylol dicyandiamide, and an oxygen-containing acid of phosphorus), U.S. Pat. No. 2,661,342 (flameproofing of cellulosic materials with a resinsous aminoplast condensation product such as melamine and a water-soluble nitrogen- and phosphorus-containing product), U.S. Pat. No. 3,023,176 (a water-soluble hardenable condensation product which is prepared by reacting a methylol compound of the aminotriazine group, an aliphatic compound containing a chain of at least 7 carbon atoms and a reactive hydrogen bound to a hetero atom, and a compound that is capable of introducing atomic groupings that raise the hydrophility in a non-ionic manner), U.S. Pat. No. 3,101,278 (methylol-phosphorus polymers which have nitrogen atoms incorporated into them are excellent flame retardants and are suitable for treating cellulosic materials), and U.S. Pat. No. 3,332,240 (an aqueous solution for flameproofing cotton fiber containing a salt of hydroxylamine and melamine resin).

Applicants have discovered a unique intumescent composition which is substantially superior to the prior art compositions.

In accordance with this invention, there is provided an intumescent composition comprising a cyclic nitrogen compound, a phosphorus compound, an acid, and water, wherein:

(a) said nitrogen compound is

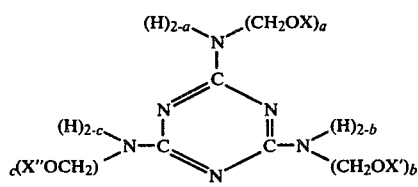

wherein a, b, and c are integers selected from the group consisting of 1 and 2, a plus b plus c equal about 3 to 6, and X, X', and X" are independently selected from the group consisting of hydrogen and —CH$_3$, provided that at least one of said X, X', and X" groups is —CH$_3$;

(b) said phosphorus compound is the reaction product of the reaction of:
1. a member selected from the group consisting of phosphorous acid, phosphoric acid, phosphonic acids, pyrophosphoric acid, diphosphoric acid, diphosphinic acids, monoesters of phosphoric acid, monoesters of polyphosphoric acid, monoesters of diphosphoric acid, diesters of diphosphoric acid, diesters of diphosphinic acid, diesters of diphosphonic acids, diesters of pyrophosphoric acid, and mixtures thereof; and
2. an oxide selected from the group consisting of alkylene oxides, alkylene dioxides, and epihalohydrin.

(c) said acid is selected from the group consisting of

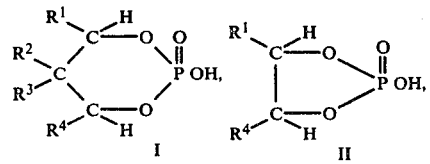

-continued

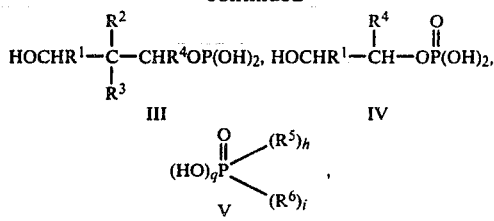

and mixtures thereof, wherein $R^1$, $R^2$, $R^3$, and $R^4$ are independently selected from the group consisting of hydrogen, alkyl of from about 1 to about 3 carbon atoms, haloalkyl of from about 1 to about 3 carbon atoms, and hydroxyalkyl of from 1 to about 3 carbon atoms, provided that the total number of carbon atoms in the $R^1$, $R^2$, $R^3$, and $R^4$ groups does not exceed about 5; wherein q is an integer of from 1 to 2, h and i are integers independently selected from the group consisting of 0, 1, and 2, and q plus h plus i equals 3; and wherein $R^5$ and $R^6$ are independently selected from the group consisting of alkyl of from about 1 to about 6 carbon atoms, haloalkyl of from about 1 to about 6 carbon atoms and from 1 to about 3 halogen atoms, hydroxy-polyalkyleneoxy containing 2 to 6 carbon atoms and 2 to 6 oxygen atoms, alkoxy of from about 1 to about 6 carbon atoms, hydroxyalkoxy of from about 2 to about 6 carbon atoms, haloalkoxy of from about 2 to about 6 carbon atoms and from about 1 to about 3 halogen atoms,

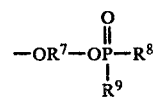

wherein $R^7$ is selected from the group consisting of alkylene of from about 2 to about 6 carbon atoms, haloalkylene of from about 3 to about 6 carbon atoms and from about 1 to about 3 halogen atoms, polyalkyleneoxy containing 2 to 6 carbon atoms and 1 to 5 oxygen atoms, and hydroxyalkylene of from 3 to about 6 carbon atoms and 1 to 4 hydroxyls, and $R^8$ and $R^9$ are independently selected from the group consisting of hydrogen, hydroxyl, alkyl of from about 1 to about 6 carbon atoms, haloalkyl of from about 1 to about 6 carbon atoms and from about 1 to about 3 halogen atoms, hydroxy-polyalkylenoxy of from about 2 to about 6 carbon atoms, and 2 to 6 oxygen atoms, alkoxy of from about 1 to about 6 carbon atoms, hydroxyalkoxy of from about 2 to about 6 carbon atoms, and haloalkoxy of from about 2 to about 6 carbon atoms and 1 to about 3 halogen atoms, provided that the total number of carbon atoms in the $R^5$ and $R^6$ groups does not exceed about 8.

Some of the acids described by formulae I and II include, e.g., 2-hydroxy-2-oxo-1,3,2-dioxaphosphorinane, 2-hydroxy-1,3,2-dioxaphospholane-2-oxide, 2-hydroxy-5-methyl-2-oxo-1,3,2-dioxaphosphorinane, 2-hydroxy-4-methyl-1,3,2-dioxaphospholane-2-oxide, 2-hydroxy-4-methyl-2-oxo-1,3,2-dioxaphosphorinane, 2-hydroxy-5-ethyl-2-oxo-1,3,2-dioxaphosphorinane, 2-hydroxy-4-ethyl-1,3,2-dioxaphosphpholane-2-oxide, 2-hydroxy-4-ethyl-2-oxo-1,3,2-dioxaphosphorinane, 2-hydroxy-5-n-propyl-2-oxo-1,3,2-dioxaphosphorinane, 2-hydroxy-4-n-propyl-1,3,2-dioxaphospholane-2-oxide, 2-hydroxy-4-n-propyl-2-oxo-1,3,2-dioxaphosphorinane, 2-hydroxy-5-isopropyl-2-oxo-1,3,2-dioxaphosphorinane, 2-hydroxy-4-isopropyl-4-methyl-1,3,2-dioxaphospholane-2-oxide, 2-hydroxy-4-isopropyl-2-oxo-1,3,2-dioxaphosphorinane, 2-hydroxy-5-chloroethyl-2-oxo-1,3,2-dioxaphosphorinane, 2-hydroxy-4-chloroethyl-1,3,2-dioxaphospholane-2-oxide, 2-hydroxy-4-chloroethyl-2-oxo-1,3,2-dioxaphosphorinane, 2-hydroxy-5-bromomethyl-2-oxo-1,3,2-dioxaphosphorinane, 2-hydroxy-4-bromoethyl-1,3,2-dioxaphospholane-2-oxide, 2-hydroxy-4-bromoethyl-2-oxo-1,3,2-dioxaphosphorine, 2-hydroxy-5-chloropropyl-2-oxo-1,3,2-dioxaphosphorinane, 2-hydroxy-4-chloropropyl-1,3,2-dioxaphospholane-2-oxide, 2-hydroxy-4-chloropropyl-2-oxo-1,3,2-dioxaphosphorinane, 2-hydroxy-5-bromopropyl-2-oxo-1,3,2-dioxaphosphorinane, 2-hydroxy-4-bromopropyl-1,3,2-dioxaphospholane-2-oxide, 2-hydroxy-4-bromopropyl-2-oxo-1,3,2-dioxaphosphorinae, 2-hydroxy-5,5-dimethyl-2-oxo-1,3,2-dioxaphosphorinane, 2-hydroxy-4,5-dimethyl-2-oxo-1,3,2-dioxaphospholane-2-oxide, 2-hydroxy-5,5-bis(bromomethyl)-2-oxo-1,3,2-dioxaphosphorinane, and the like.

Difunctional compounds of formulae III and IV may be utilized in the intumescent composition of this invention. These compounds usually contain both acid and hydroxy substituents. They may be used to replace either the acid compound and/or the phosphorus compound. Some of the difunctional compounds which may be utilized in the composition of this invention include, e.g., 2-hydroxyethyl phosphoric acid, 3-hydroxy-2-propyl phosphoric acid, 1-hydroxy-2-butyl phosphoric acid, 3-hydroxy-2,2-diethyl-1-propyl phosphoric acid, 2,2-dimethyl-3-hydroxy-1-propyl phosphoric acid, 3-hydroxy-1-propyl phosphoric acid, 2,2-bis(bromomethyl)-3-hydroxy-1-propyl phosphoric acid, 2,2-bis(chloromethyl)-3-hydroxy-1-propyl phosphoric acid, 2,2-bis(chloroethyl)-3-hydroxy-1-propyl phosphoric acid, 2,2-bis(hydroxymethyl)-3-bromo-1-propyl phosphoric acid, 2,2-bis(hydroxymethyl)-3-chloro-1-propyl phosphoric acid, and the like.

Some of the acids described by formula V are shown in Table I.

TABLE I

| $R^5$ | $R^6$ | q | h | i |
|---|---|---|---|---|
| chloromethyl | | 2 | 1 | 0 |
| 2'-hydroxyethoxyethyl | | 2 | 1 | 0 |
| 2'-hydroxyethoxyethyl | | 1 | 2 | 0 |
| 2,2,2 tris-hydroxy methyl ethyl | | 2 | 1 | 0 |
| 4-hydroxy-1-butyl | | 2 | 1 | 0 |
| chloroethoxy | | 2 | 1 | 0 |
| chloroethoxy | | 1 | 2 | 0 |
| bromoethoxy | | 2 | 1 | 0 |
| bromoethoxy | | 1 | 2 | 0 |
| 1,3 dichloro-2-propoxy | | 2 | 1 | 0 |
| 1,3 dichloro-2-propoxy | | 1 | 2 | 0 |
| $-OCH_2CH_2OCH_2CH_2O\overset{O}{\overset{\|}{P}}(OH)_2$ | | 2 | 1 | 0 |
| $-OCH_2CH_2O\overset{O}{\overset{\|}{P}}(OH)_2$ | | 2 | 1 | 0 |
| $-CH_2\underset{CH_2Cl}{\overset{CH_2Cl}{C}}CH_2O\overset{O}{\overset{\|}{P}}(OH)_2$ | | 2 | 1 | 0 |
| $-OCH_2\underset{CH_2OH}{\overset{CH_2OH}{C}}CH_2O\overset{O}{\overset{\|}{P}}(OH)_2$ | | 2 | 1 | 0 |
| methyl | | 2 | 1 | 0 |
| methyl | | 1 | 2 | 0 |
| ethoxy | | 2 | 1 | 0 |
| ethoxy | | 1 | 2 | 0 |
| hydroxy polyethyleneoxy (1–3 repeat units) | | 1 | 2 | 0 |
| hydroxy polyethyleneoxy (1–3 repeat units) | | 2 | 1 | 0 |
| chloroethyl | | 2 | 1 | 0 |
| chloroethyl | | 1 | 2 | 0 |
| tribromoneopentoxy | | 2 | 1 | 0 |
| trichloroneopentoxy | | 2 | 1 | 0 |
| chloroneopentoxy | | 2 | 1 | 0 |
| butyl | | 2 | 1 | 0 |
| butyl | | 1 | 2 | 0 |
| butoxy | | 2 | 1 | 0 |
| butoxy | | 1 | 2 | 0 |
| $-OCH_2CH_2O\overset{O}{\overset{\|}{P}}(OCH_2CH_2OCH_2CH_2OH)_2$ | | 2 | 1 | 0 |
| ethyl | butyl | 1 | 1 | 1 |
| ethoxy | butoxy | 1 | 1 | 1 |
| chloroethoxy | 1,3-dichloro-2-propoxy | 1 | 1 | 1 |
| chloroneopentoxy | chloroethoxy | 1 | 1 | 1 |
| chloromethyl | chloroethoxy | 1 | 1 | 1 |
| bromopropoxy | chloroethoxy | 1 | 1 | 1 |

Compounds I and III may be prepared by hydrolyzing an acid chloride of I in accordance with the following reaction scheme:

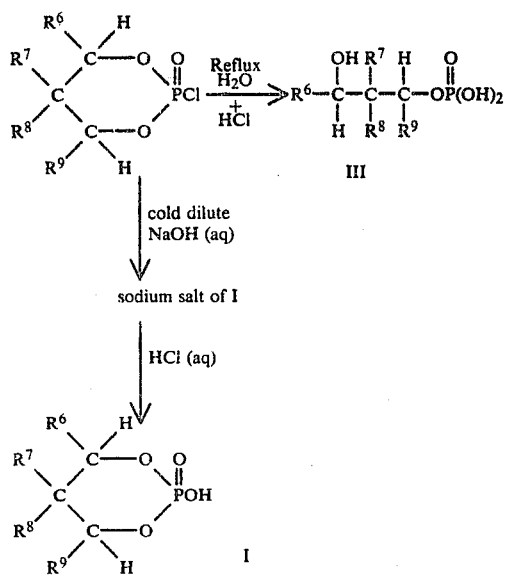

A comparable reaction scheme utilizing the acid chloride of structure II as the reactant may be used to prepare compounds II and IV.

Many of the acids described by formula V may be prepared by hydrolyzing the acid chloride of compound V. The acid chloride starting materials are well known to the art. When the acids are prepared by this method, the initial hydrolysis reaction may be conducted in water under mild conditions and/or in the presence of sufficient caustic so that the pH of the reaction mixtures is at least 7.0. Hydrochloric acid may be used to neutralize the sodium salt of the acid and help release the free acid. The following reaction scheme may be used to prepared this compound.

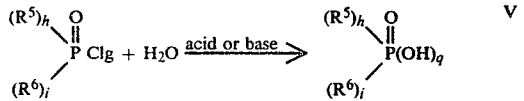

It is preferred that the acid used in the intumescent composition of this invention be soluble in either water and/or the phosphorous compound used in this composition; when one part of the preferred acid is mixed with no more than one part of the component in which it is soluble at 25 degrees centigrade, a one phase solution is formed.

It is preferred that the intumescent composition of this invention contain from about 2 to about 35 percent (by weight) of said acid; it is more preferred that siad composition contain from about 14 to about 28 percent (by weight) of said acid.

The intumescent coating composition of this invention contains a cyclic nitrogen compound. It is preferred that this composition contain from about 30 to about 60 percent (by weight) of said cyclic nitrogen compound; it is more preferred that it contain from about 35 to about 50 percent (by weight) of said cyclic nitrogen compound. As used in this specification, the term "percent" refers to the ratio of the weight of the component involved divided by the weight of all the components in the composition; this ratio multiplied by 100 gives one the weight percent of the component.

The cyclic nitrogen compound used in the intumescent coating composition of this invention is described by the formula

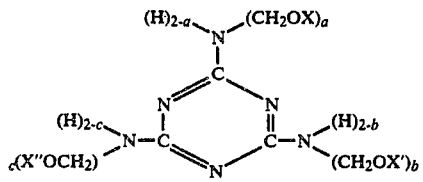

wherein a, b, and c are integers selected from the group consisting of 1 and 2, a plus b plus c equal about 3 to 6, and X, X', and X" are independently selected from the group consisting of hydrogen and —CH$_3$. It is preferred that at least one of said X, X', and X" groups be —CH$_3$. This cyclic nitrogen compound may be prepared by reacting at least three moles of formaldehyde per mole of melamine and then etherifying the methylol groups by reaction of the methylol melamine with methanol in the presence of an acid catalyst.

In the more preferred cyclic nitrogen compound used in the intumescent composition of this invention, at least about two of said X, X', and X" groups are —CH$_3$. In the most preferred embodiment, at least three of said X, X', and X" groups are —CH$_3$.

The intumescent composition of this invention contains a phosphorus polyol. It is preferred that this composition contain from about 10 to about 50 percent (by weight) of said phosphorus polyol. This phosphorus compound is a reaction product prepared by reacting:

1. a member selected from the group consisting of phosphorous acid, phosphoric acid, phosphonic acids, pyrophosphoric acid, diphosphoric acid, diphosphinic acids, monoesters of phosphoric acid, monoesters of polyphosphoric acid, monoesters of diphosphoric acid, diesters of diphosphoric acid, diesters of diphosphinic acid, diesters of diphosphonic acids, diesters of pyrophosphoric acid, and mixtures thereof; and
2. an oxide selected from the group consisting of alkylene oxides, alkylene dioxides, and epihalohydrin.

Some of the phosphorus compounds used in the intumescent composition of this invention are described in, e.g., U.S. Pat. No. 3,525,705.

The phosphorus polyols which may be used in the composition of this invention may be prepared by reacting a phosphorus reactant with an alkylene oxide or alkylene dioxide. Suitable phosphorus reactants include, e.g.,

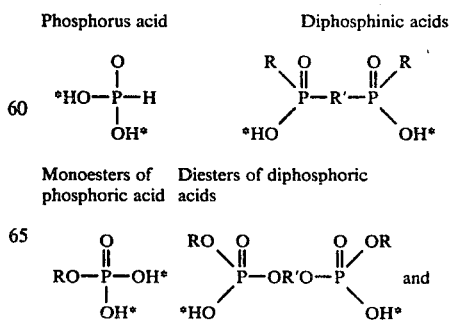

-continued

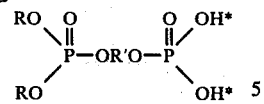

Phosphonic acids   Diesters of diphosphonic acids

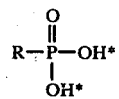 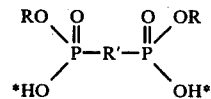 and

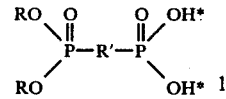

Diesters of pyrophosphoric acid

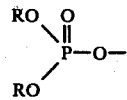 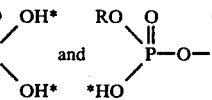   and

In the above formulae R represents an alkyl or aryl radical, substituted or unsubstituted, and R' represents an alkylene or arylene radical or a series of alkylene or arylene radicals which may be separated by heteroatoms such as O, N and S; as for example,

—CH₂CH₂OCH₂CH₂OCH₂CH₂—

—C₆H₄—, —C₆H₄OC₆H₄—, or others. The "*" denotes active hydrogen.

It is preferred that the R and R' radicals each contain from about 1 to about 10 carbon atoms.

Other suitable phosphorus reactants include

Phosphoric acid

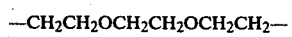

Pyrophosphoric acid

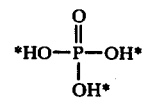

Polyphosphoric acids, such as tripolyphosphoric acid.

Monoesters of polyphosphoric acid

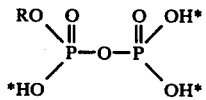

Diphosphonic acids

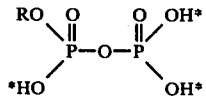

Monoester of diphosphonic acids

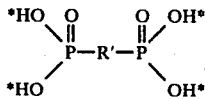

-continued

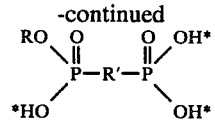

Diphosphoric acids

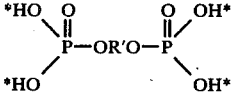

Monoesters of diphosphoric acids

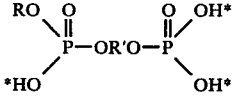

The product of a glycol, HOR'OH, reacted with P₂O₅ or POCl₃. The product of a polyglycol, H(OR')₂OH, reacted with P₂O₅ or POCl₃. The product of a mixture of a glycol or a polyglycol and an alcohol, ROH, reacted with P₂O₅ or POCl₃. The product of a polyhydroxy compound reacted with P₂O₅ or POCl₃ wherein R represents an alkylene or arylene radical or a series of alkylene or arylene radicals which may be separated by heteroatoms such as O, N and S; as for Example —CH₂CH₂OCH₂CH₂OCH₂CH₂—, —C₆H₄—C₆H₄—C₆H₄OC₆H₄—, or others, connected to a phosphorus atom directly or through oxygen, sulfur or nitrogen and R' represents an alkyl or aryl radical or hydrogen.

The phosphorus polyol obtained, which may be used in the composition of this invention, contains at least two active hydrogen atoms per molecule. It is preferred that this phosphorus polyol be prepared by reacting alkylene oxides with phosphoric acid. In another preferred embodiment, the polyol is prepared by reacting dialkyl pyrophosphoric acids with alkylene oxide.

In one preferred embodiment, phosphoric acid is reacted with an alkylene oxide of the formula

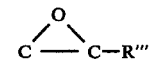

wherein R''' is alkyl or haloalkyl of from about 1 to about 3 carbon atoms. If only one of these cyclic compounds is used, all of the R groups in the poly(alkoxylated) phosphoric acid obtained will be the same. If several of these compounds are used and reacted either simultaneously and/or consecutively with phosphoric acid, a compound containing different R groups will be obtained.

When an oxyalkylated polyhydric alcohol is used in the intumescent composition of this invention, it is preferred that it be soluble in either water or the acid used and that it have a molecular weight of less than about 800. In one preferred embodiment, R''' is selected from the group consisting of hydrogen, methyl, chloromethyl, and bromomethyl.

The intumescent composition of this invention contains water. It is preferred that said composition be comprised of from about 5 to about 50 percent (by weight) of water; it is more preferred that said composition be comprised of from about 8 to about 40 percent (by weight) of water.

The intumescent composition of this invention may be prepared by means known to the art. One may, e.g., mix in a dry state the cyclic nitrogen compound, the phosphorus compound, and the acid and then add the specified amount of water to the mixture. It is preferred, however, to mix solutions of said compounds together; the concentrations of such solution are such that, after they are mixed together, the intumescent composition which results contains the specified amounts of water, cyclic nitrogen compound, phosphorus compound, and acid.

Generally, the components of the intumescent composition of this invention are mixed together for at least about 60 seconds, although longer and shorter mixing times may be used.

The intumescent composition of this invention should be applied to a wood substrate within about 240 minutes of the time it is prepared. Although it is useful for most wood substrates, it is especially useful for imparting durable flame retaradancy to a plywood substrate.

Plywood is a material made by bonding wood together with an adhesive. The layers are usually veneer; they are generally no greater than about 0.1875" thick for hardwood plywood and 0.1667" thick for softwood plywood. The successive layers (plies) have their grains at a definite angle to each other, usually 90 degrees.

The composition of this invention may be advantageously utilized with any of the plywood substrates well known to the art. It may be applied to this type of substrate by any method known to the art such as, e.g., spraying, brushing, or coating the composition onto the plywood. It is preferred that the dry solids add on of the intumescent composition of this invention be from about 3 to about 15 grams per square foot of plywood surface treated. The "add on" is determined by weighing the substrate before and immediately after it is treated. The percent of the solids in the composition applied times this difference is the number of grams of dry solids applied; the number of grams of dry solids applied divided by the number of square feet treated is the "add on" referred to in this specification. One coat of the intumescent composition of this invention may be applied; it is preferred, however, to apply two or more coats.

After the composition of this invention is applied to the wood substrate, it is dried. It may be air dried, in which case up to about 30 hours should be allowed for it to dry. It may be dried by techniques well known to those skilled in the art. If heat is applied to the treated substrate, it is preferred to use a temperature of from about 70 to about 170 degrees centigrade for from about 1 to about 20 minutes. It is more preferred to dry the treated substrate at a temperature of from about 95 to about 110 degrees centigrade for from about 3 to about 10 minutes.

The following examples illustrate the claimed invention and are not to be deemed limitative thereof. Unless otherwise specified, all parts are by weight, all temperatures are in degrees centigrade, all weights are expressed in grams, and all volumes are expressed in milliliters.

EXAMPLE 1

2,2-bis(bromomethyl)-3-hydroxy-1-propyl phosphoric acid.

Five thousand two hundred and forty grams (20.0 moles) of dibromoneopentyl glycol and 3,070 grams of phosphoryl chloride were placed in a 12-liter round bottom flask equipped with a stirrer, heating mantle and condenser. The reaction mixture was consecutively maintained at ambient temperature for 30 minutes, a temperature of 40–45 degrees centigrade for 60 minutes, a temperature of 50 degrees centigrade for 60 minutes, a temperature of 70 degrees centigrade for 60 minutes, a temperature of 90 degrees centigrade for 120 minutes, and a temperature of 110 degrees centigrade (under aspirator vacuum) for 60 minutes. The reaction mixture was allowed to stand overnight. The reaction mixture thus formed was subjected to an absolute pressure of about 25 millimeters of mercury for about 360 minutes during which water and hydrogen chloride were removed from the mixture and the reaction temperature was allowed to to increase to a maximum temperature of about 100 degrees centigrade.

The phosphoric acid obtained was a semi-solid material. The product was dissolved in sufficient water to produce a 60 percent solution. Elemental analysis of the solution indicated that it contained 27.0 percent of bromine; according to theory, it should have contained 28.5 percent of bromine.

EXAMPLE 2

Fifty parts of Aerotex ® M-3 resin (a trimethylated trimethylol melamine compound available from the American Cyanamid Corporation) were mixed with 25 parts of Vircol 82 ® (an oxyalkylated polyhydric alcohol available from the Mobile Chemical Corporation) and 25 parts of a 60 percent aqueous solution of the compound of Example 1.

Two coats of this formulation were brushed onto a lauan plywood sample (which was 24.0" long, 3.5" wide, and 0.1875" thick to a dry solids add on of 8 grams per square foot. The coated sample was then dried at a temperature of about 100 degrees centigrade for about 5 minutes. Thereafter the sample was subjected to a two-foot tunnel test to determine the flame spread rate; this test was conducted in substantial accordance with the procedure described in an article entitled "Two-Foot Tunnel Test," *Journal of Paint Technology*, Vol. 11, No. 565, February 1972, pp. 43–47; however the panels were not aged as described in this article.

The two-foot tunnel test is a small-scale test designed to simulate the UL Steiner 25-foot tunnel test described by ASTM E84-68. In the former test, the two-foot tunnel was inclined 28 degrees from the horizontal and utilized approximately 96 aquare inches of test surface. The test specimen was mounted on an angle iron frame in such a way that the surface to be evaluated formed the ceiling of the tunnel. A standard Meeker burner was placed at the lower end of the tunnel, and the specimen was subjected to the flame from this burner for five minutes; during the first four minutes, the length of the advance of the flame front up the inclined panel was recorded at 15 second intervals. The flame lengths were measured by observing the flame front advance through a calibrated window located on the side of the tunnel. The tunnel was calibrated prior to specimen testing by determining the difference in flame lengths of a specimen of asbestos cement board and a specimen of red oak; this difference, by introduction of a constant K, was given a flame spread rating ("FSR") of 100. The flame spread rate calculation was made in accordance with the formula $F.S.R. = (L_n - L_a)K$, wherein F.S.R. was the flame spread rating, $L_n$ was the observed flame of the specimen tested, $L_a$ was the flame for asbestos cement board, $L_o$ was the observed flame length for the red oak sample, and $K=(100/L_o-L_a)$.

The samples were weighed both before and after being tested in the two-foot tunnel, and the percent weight loss due to combustion of the sample was determined.

The coated plywood sample of this example had a flame spread rating of 30. The coating intumesced during the test and protected the wood surface.

A control experiment was conducted wherein the lauan plywood sample which was subjected to the two foot tunnel test was not coated with the intumescent composition of this invention. The uncoated plywood sample had a flame spread rating of 95 and lost about 18 percent of its weight after the two foot tunnel test.

EXAMPLES 3-6

In substantial accordance with the procedure described in Example 2, various coating formulations were prepared, applied to lauan plywood samples measuring $24''\times3.5''\times0.1875''$, and dried; and the coated plywood samples were tested in the two foot tunnel to determine their flame spread ratings and how much weight they lost during the test. Table II presents the results of these experiments, indicating the formulations and conditions used in each Example.

TABLE II

| Example Number | 3 | 4 | 5 | 6 |
|---|---|---|---|---|
| Dry Solids Add On | 10 | 10 | 8 | 9 |
| Parts of 80 Percent Aqueous Soln. of Methylated Trimethylol Melamine | 50 | 0 | 50 | 50 |
| Parts of Methylated Hexamethylol Melamine | 0 | 50 | 0 | 0 |
| Parts of Vircol 82 ® | 40 | 25 | 25 | 40 |
| Parts of 85 Percent Aqueous Soln. of Phosphoric Acid | 5 | 0 | 0 | 2 |
| Parts of Water | 5 | 0 | 0 | 8 |
| Parts of 60 Percent Aqueous Soln. of 2,2-bis(bromomethyl-3-hydroxy-1-propyl phosphoric acid | 0 | 25 | 25 | 0 |
| Weight Loss, Percent | 8.5 | N.D. | 6.5 | 9 |
| Flame Spread Rating | 70 | 35 | 30 | 55 |

The above examples have been described for the purpose of illustration, not limitation. Many other modifications will suggest themselves to those skilled in the art; they are intended to be comprehended within the scope of the invention.

The embodiments of this invention in which an exclusive property or privilege is claimed are as follows:

1. An intumescent composition comprising a cyclic nitrogen compound, a phosphorus polyol, a phosphorus acid, and water, wherein:

(a) said nitrogen compound is

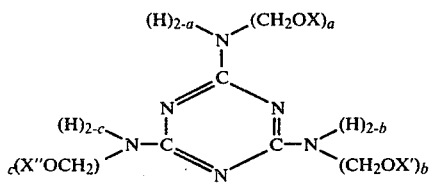

wherein a, b, and c are integers selected from the group consisting of 1 and 2, a plus b plus c equal about 3 to 6, and X, X', and X" are independently selected from the group consisting of hydrogen and —$CH_3$, provided that at least one of said X, X', and X" groups is —$CH_3$;

(b) said phosphorus polyol is the reaction product of the reaction of:

1. a member selected from the group consisting of phosphorous acid, phosphoric acid, phosphonic acids, pyrophosphoric acid, diphosphoric acid, diphosphinic acids, monoesters of phosphoric acid, monoesters of polyphosphoric acid, monoesters of diphosphori acid, diesters of diphosphoric acid, diesters of diphosphinic acid diesters of diphosphonic acids, diesters of pyrophosphoric acid, and mixtures thereof; and
2. an oxide selected from the group consisting of alkylene oxides, alkylene dioxides, and epihalohydrin.

(c) said acid is selected from the group consisting of

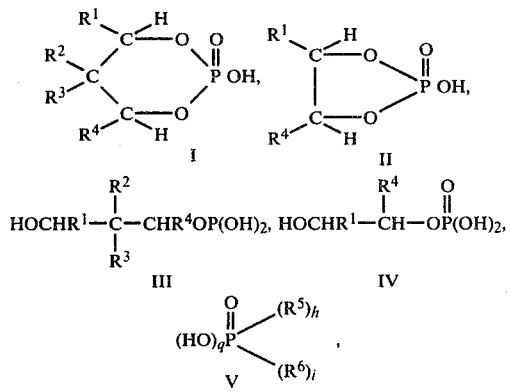

and mixtures thereof, wherein $R^1$, $R^2$, $R^3$, and $R^4$ are independently selected from the group consisting of hydrogen, alkyl of from about 1 to about 3 carbon atoms, haloalkyl of from about 1 to about 3 carbon atoms, and hydroxyalkyl of from 1 to about 3 carbon atoms, provided that the total number of carbon atoms in the $R^1$, $R^2$, $R^3$, and $R^4$ groups does not exceed about 5; wherein q is an integer of from 1 to 2, h and i are integers independently selected from the group consisting of 0, 1, and 2, and q plus h plus i equals 3; and wherein $R^5$ and $R^6$ are independently selected from the group consisting of alkyl of from about 1 to about 6 carbon atoms, haloalkyl of from about 1 to about 6 carbon atoms and from 1 to about 3 halogen atoms, hydroxy-polyalkyleneoxy containing 2 to 6 carbon atoms and 2 to 6 oxygen atoms, alkoxy of from about 1 to about 6 carbon atoms, hydroxyalkoxy of from about 2 to about 6 carbon atoms, haloalkoxy of from about 2 to about 6 carbon atoms and from about 1 to about 3 halogen atoms,

wherein $R^7$ is selected from the group consisting of alkylene of from about 2 to about 6 carbon atoms, haloalkylene of from about 3 to about 6 carbon atoms and from about 1 to about 3 halogen atoms, polyalkyleneoxy containing 2 to 6 carbon atoms and 1 to 5 oxygen atoms, and hydroxyalkylene of from 3 to about 6 carbon atoms and 1 to 4 hydroxyls, and $R^8$ and $R^9$ are independently selected from the group consisting of hydrogen, hydroxyl, alkyl of from about 1 to about 6 carbon atoms, haloalkyl of from about 1 to about 6 carbon atoms and from about 1 to about 3 halogen atoms, hydroxypolyalkylenoxy of from about 2 to about 6 carbon atoms, and 2 to 6 oxygen atoms, alkoxy of from about 1 to about 6 carbon atoms, hydroxyalkoxy of from about 2 to about 6 carbon atoms, and haloalkoxy of from about 2 to about 6 carbon atoms and 1 to about 3 halogen atoms, provided that the total number of carbon atoms in the $R^5$ and $R^6$ groups does not exceed about 8.

2. The intumescent composition of claim 1, wherein said composition contains, by weight, from about 30 to about 60 percent of said cyclic nitrogen compound, from about 10 to about 50 percent of said phosphorus polyol, from about 2 to about 35 percent of said phosphorus acid, and from about 5 to about 50 percent of water.

3. The intumescent composition of claim 2, wherein at least one of said X, X', and X" groups is —CH$_3$.

4. The intumescent composition of claim 3, wherein said composition contains from about 35 to about 50 percent of said cyclic nitrogen compound, from about 14 to about 28 percent of said phosphorus acid, and from about 8 to about 40 percent of water.

5. The intumescent composition of claim 4, wherein at least two of said X, X', and X" groups are —CH$_3$.

6. The intumescent composition of claim 5, wherein said oxide is selected from the group consisting of ethylene oxide, propylene oxide, and butylene oxide.

7. The intumescent composition of claim 5, wherein said phosphorus polyol is prepared by reacting phosphoric acid with an alkylene oxide of the formula

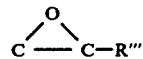

wherein R''' is alkyl or haloalkyl of from about 1 to about 3 carbon atoms.

8. The intumescent composition of claim 7, wherein R''' is selected from the group consisting of hydrogen, methyl, chloromethyl, and bromomethyl.

9. The intumescent composition of claim 5, wherein said phosphorus polyol is prepared by reacting a diester of pyrophosphoric acid with propylene oxide.

10. The intumescent composition of claim 9, wherein said diester of pyrophosphoric acid is dibutyl phosphoric acid.

11. The intumescent composition of claim 10, wherein said phosphorus acid is 2,2-bis(bromomethyl)-3-hydroxy-1-propyl phosphoric acid.

* * * * *